Oct. 21, 1969 W. G. MILLER 3,474,243
SUPPORT ASSEMBLY FOR UNDERWATER LAMP
Filed March 30, 1967 2 Sheets-Sheet 1
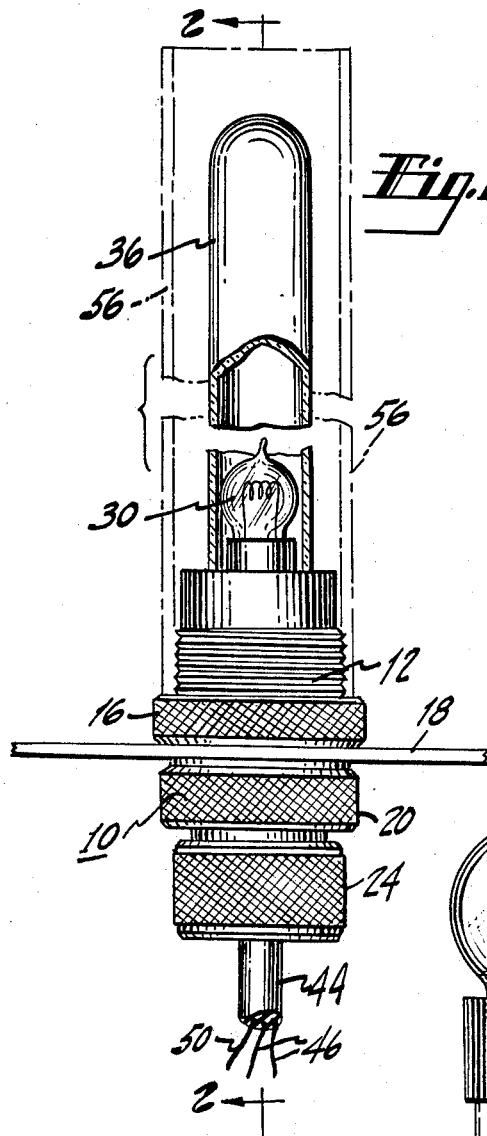
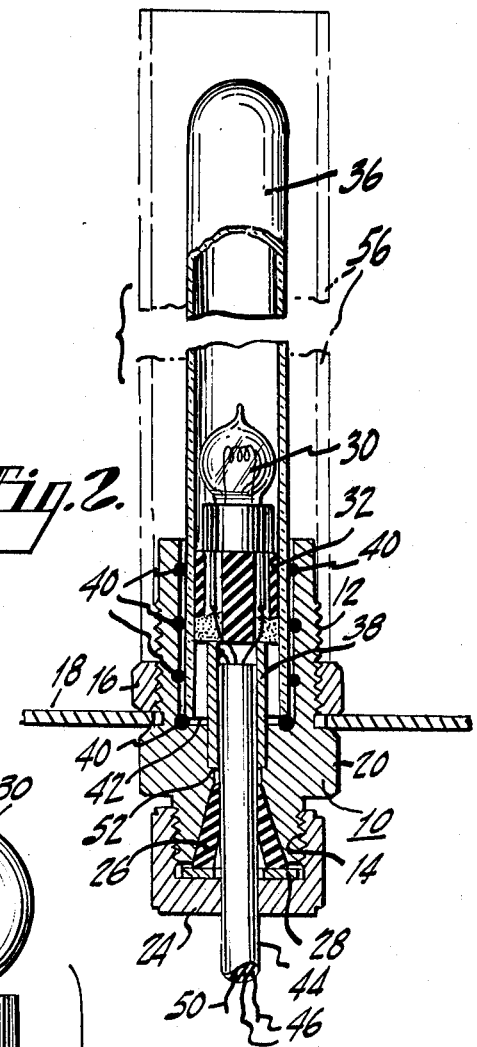
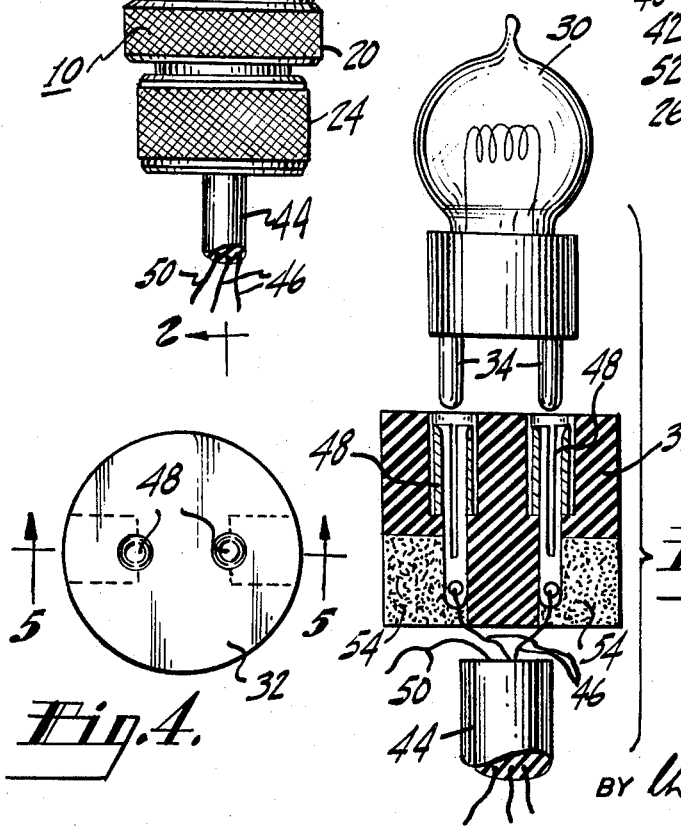
INVENTOR
WILLIAM G. MILLER
BY Charles H. Brown
ATTORNEY Oct. 21, 1969   W. G. MILLER   3,474,243
SUPPORT ASSEMBLY FOR UNDERWATER LAMP
Filed March 30, 1967   2 Sheets-Sheet 2

INVENTOR
WILLIAM G. MILLER
BY Charles H. Brown
ATTORNEY

United States Patent Office 3,474,243
Patented Oct. 21, 1969

3,474,243
SUPPORT ASSEMBLY FOR UNDERWATER LAMP
William G. Miller, Forest Hills, N.Y., assignor to Oceanographic Ventures Inc., Miami, Fla., a corporation of Delaware
Filed Mar. 30, 1967, Ser. No. 627,175
Int. Cl. G03b 15/02; F21v 31/00
U.S. Cl. 240—1.3                                9 Claims

ABSTRACT OF THE DISCLOSURE

A self-sealing, protective support assembly for an underwater lamp useful for color underwater photography, including a metal adapter constructed at one end to house the lamp and confine it within a transparent glass protective cover, and at the other end to accommodate an electric cable. The glass cover is spaced from the lamp and arranged so as not to obstruct any of the rays emanating from the lamp, thus the cover is designed to assure a maximum uniform very wide angle transmission of light rays. Water sealing means are provided between the adapter and the base area of the glass cover and between the adapter and electric cable.

---

The invention comprises a novel support assembly for an underwater lamp which is useful for underwater photography, particularly color photography, and has the following highly desirable characteristics: (1) It enables the widest possible useful angle of illumination for the light rays emanating from the lamp; (2) It provides protection for the lamp; (3) It assures a highly efficient watertight seal between the lamp, its socket, the terminals of the associated electric cable and the surrounding water when immersed therein; and (4) It is lightweight, compact and easily carried in the hand.

An underwater lighting problem, presently existing in the use of known underwater lamps, is the narrow angle over which reasonably good pictures can be made. The intensity of light radiated underwater by such known lamps is greatest over only a narrow angle in the direction of the light beam and is considerably reduced at angles outside the main direction of the light beam, and ceases altogether, so far as picture taking is concerned, as the angle from the main direction of the beam is further widened. Other underwater lighting problems of known systems are caused by inadequate lighting for the taking of good pictures due to the fact that the lamp bulb burns at the wrong Kelvin temperature for certain films, such as Ektachrome film; the bulky and heavy underwater lighting equipment which must be carried by the cameraman, and the corrosive nature of seawater which creates electrolysis effects when certain metals are used together.

The foregoing problems, among others, are overcome by the present invention which provides a highly effective wide angle underwater lighting assembly of reduced size and weight and which is self-sealing under high working pressures.

Generally stated, the present invention comprises a unique self-sealing protective support assembly for an underwater lamp. This support assembly is compact, lightweight and provides a very wide angle of generally uniform illumination for the light rays. The angle may extend from 180° to any lesser desired angle over which good color pictures may be taken, depending to some extent on the configuration of the reflector. The lamp support assembly of the invention has a built-in safety factor and enables the lamp to operate at the correct color Kelvin temperature for various films, for example Ektachrome film, to thereby provide a high approximation of true colors for underwater cinematography. The lamp support or adaptor member of the assembly is constructed to house the lamp bulb and permit its confinement within a highly transparent test tube type of protective glass cover. The highly transparent glass protective cover prevents the lamp bulb temperature from being reduced by the colder, surrounding seawater and assures the transmission of a desired color spectrum of high intensity from the lamp bulb through the glass cover. Thus the lamp bulb is made to function at a desired high Kelvin temperature which deepens the light ray color spectrum penetration of the water. The construction of the glass cover assures the maximum uniform wide area transmission of light and is such as to assure a greater water-sealing capability as the working pressure increases at greater depths of operation.

A more detailed description of the invention follows in conjunction with a drawing, wherein FIG. 1 is a side elevation view of the underwater support assembly of the invention and shows the lamp bulb in position within a protective glass cover as used for underwater photography;

FIG. 2 is a sectional view of the support assembly of FIG. 1;

FIG. 4 is an enlarged top or plan view of the insulation socket into which the leads or terminals of the lamp bulb (shown in FIG. 5) are inserted for electrical connection to the cable connections; and FIG. 5 is an enlarged sectional view of the insulation socket of FIG. 4 and shows how the lamp bulb and electrical cable are connectable thereto.

Throughout the figures of the drawing the same parts are designated by the same reference numerals.

Figure 3:
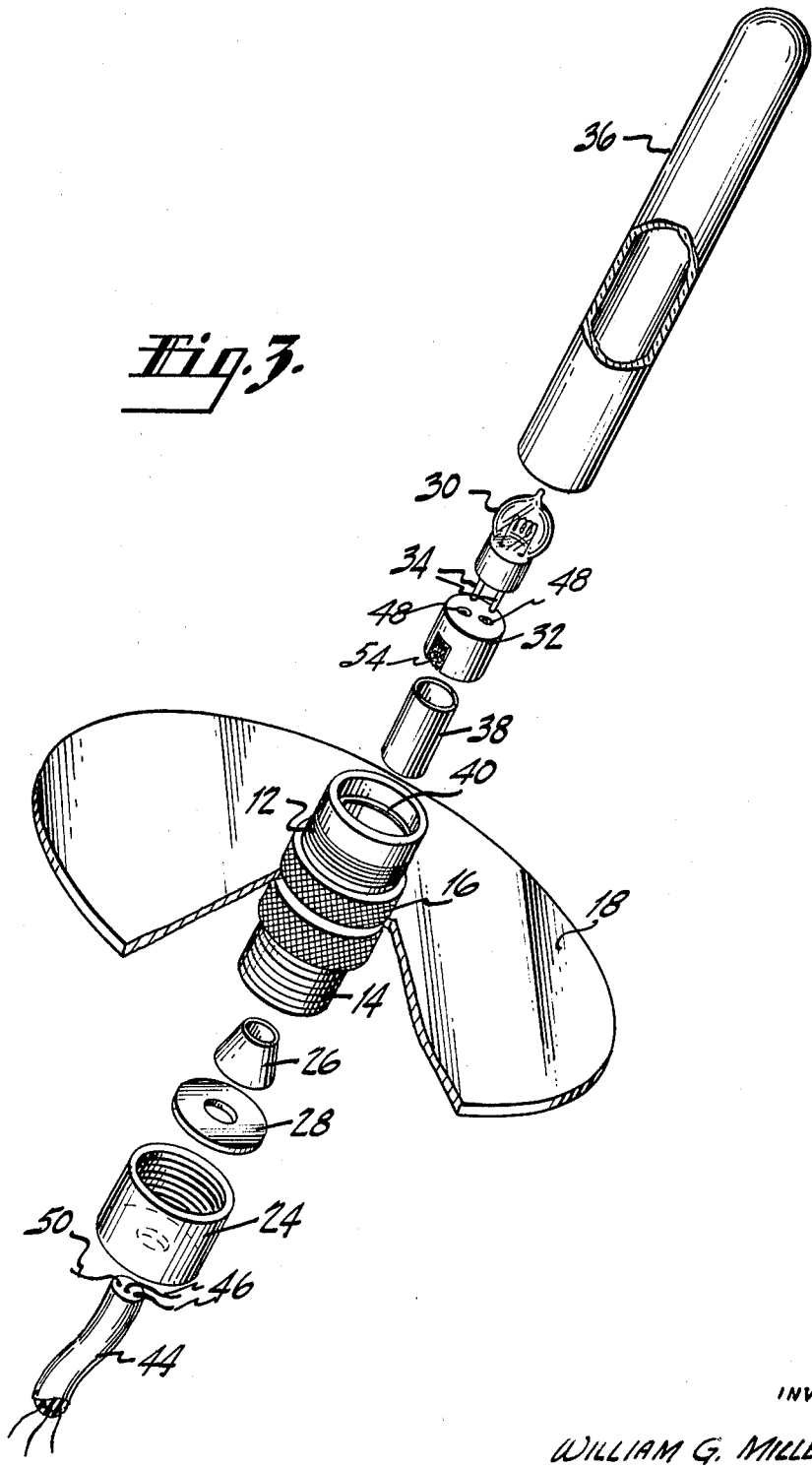
FIG. 3 is an exploded view, in perspective, of the elements of the support assembly of FIGS. 1 and 2.

The lamp support assembly of the invention includes a hollow metal adaptor or nipple 10 threaded exteriorly at both end portions 12 and 14, a compression fitting 16 interiorly threaded for engaging the threads on end portion 12 to thereby clamp a light reflector 18 between it and an intermediate stationary portion 20 of the adaptor 10, and an interiorly threaded gasket nut 24 engaging end portion 14 for clamping down or exerting pressure on a hollow conically-tapered resilient rubber water sealing gasket member 26 via gasket washer 28. The exterior surfaces of compression fitting 16, intermediate portion 20 and nut 24 are respectively knurled to permit ease in handling.

The hollow adaptor 10 serves as a watertight housing for the lamp bulb 30, the insulation socket 32 into which the two terminal leads 34 of the lamp bulb are inserted, the highly transparent protective glass cover 36, the tapered resilient rubber water sealing member 26, the gasket washer 28 and a ground sleeve 38, as shown in FIG. 2. The interior of adaptor 10 at its end portion 12 is provided with four spaced O rings 40 of resilient rubber or Teflon of a material resistant to water penetration.

The inner diameter of the end portion 12 and the dimensions of the transparent glass protective cover 36, the lamp 30 and the insulation socket 32 are so related that the open end portion of the glass cover 36 fits very snugly and tightly over the outer surface of the insulation socket 32, and the open end edge of the glass cover rests against the inner shoulder or flange 42 of the adaptor and the lowermost O ring in the assembled position of the various parts. An extremely watertight and effective water seal is thus achieved between the exterior surface of the glass protective cover 36 and the interior surface of the adaptor at all working pressures under water.

The construction of the test tube type of protective cover 36 is such that the greater the working pressure of the water the greater will be the pressure on the closed end of the glass cover, thereby forcing the open end edge of the glass cover into a tighter seal with the lowermost O ring which the edge engages. If desired, the closed end of the cover 36 may have a flatter contour than the round contour shown. The glass protective cover 36 should be able to withstand the water pressure and the difference in temperatures between the cold outer seawater and the high heat from the lamp bulb on the inside of the cover. If desired, the glass cover can be designed to balloon out at the location of the light bulb to give softer light and wider light coverage.

The conically-shaped resilient rubber gasket 26 is designed to provide an effective watertight seal between the electric cable 44 which it surrounds and the interior of the end portion 14 of the adaptor. The lowermost interior surface of end portion 14 is tapered to conform to the outer taper on the gasket 26. Any pressure exerted on washer 28 by the tightening of gasket nut 24 on the adaptor or from water tending to enter the apertured center of the gasket nut forces or wedges the gasket 26 tightly against the tapered inner surface of end portion 14 thereby sealing the interior of the end 14 from water.

Insulation socket 32 may be made of any suitable highly electrically insulating material, such as round linen micarata, and comprises two suitable spaced longitudinally extending openings into which are inserted metallic U-shaped terminal spring members 48, the lowermost ends of which are respectively soldered to the two energizing wires 46 of electric underwater cable 44. The dimensions and spacing of the openings in the socket and the construction of the U-shaped springs are such that the terminal leads of the lamp bulb 30 can be inserted therein, as shown in FIG. 2. A pair of slots extending about half way up from the bottom of the socket 32 enables easy insertion of the U-shaped spring members 48 into the respective associated openings in the socket and also easy soldering of the electric cable wires 46 to these spring members. After the U-shaped members 48 are soldered to the cable wires and inserted into the openings of the socket 32, as shown in FIGS. 2 and 5, the slots are filled with a suitable resin or insulating material 54 which hardens with the passage of time, thereby resulting in all parts of the socket constituting a single integral unit.

Underwater electric cable 44 is provided with a grounding wire 50 for protective purposes, and this grounding wire is soldered to a cylindrical metallic sleeve 38 on which the socket 32 rests, as shown in FIG. 2. The lowermost end of metallic sleeve 38 rests on a circular narrow ledge or shoulder 52 in the interior of adaptor 10, as shown in FIG. 2.

The metallic parts of the support assembly are made of the same material, such as from brass stock, in order to prevent galvanic corrosion due to electrolysis which occurs when certain different materials are employed together in seawater.

The support assembly of the invention is light in weight, highly compact and easily carried in the hand or on a bracket with other similar support assemblies. It enables the reproduction of true colors of objects and fish at deep depths over very wide angles. In the operation of the invention, the glass protective cover 36 is spaced from the enclosed light bulb and prevents the seawater from contacting the lamp bulb. The lamp bulb is thus permitted to operate at its most efficient Kelvin temperature without any reduction in bulb temperature. A reduced bulb temperature results in blackening or oxidation of the interior of the bulb and hence a variation in the color spectrum of the light rays. The confinement of the bulb in the test tube protective glass cover tends to generate more heat, increases the Kelvin temperature and produce deeper light ray penetration in the water. The shape of the glass cover provides an extremely wide angle of substantially uniform light emission with a highly desirable color spectrum. This angle is 180° when a highly polished flat reflector is employed, and a narrower angle when a parabolic or curved reflector is employed.

The support assembly of the invention was successfully built and tested under 250 lbs. per square inch pressure. The watertight seals in the assembly functioned perfectly. The underwater cable 44 can be designed to feed 120 volts alternating current directly to a light bulb 30 of 650 watts capacity at 3,400 Kelvin. Where a long cable of 200–300 feet is used, the input to the cable should be about 130 volts to take care of the IR drop in the cable and still provide 120 volts at the lamp. Such a light bulb of small dimensions is known as a heavy duty movie light lamp and commercially sold by General Electric and Sylvania and is known by the designation 650 D.V.A. A suitable color film for such a bulb is commercially known as a 7242 Type B film having a 3,200 Kelvin Color Temperature Absolute Temperature Scale.

In handling the support assembly outside water, to prevent breakage of the glass cover 36, there is provided a shipping metal guard 56 which fits over the glass cover and is removably secured to the support assembly by spaced screws, not shown, for holding the metal guard to the assembly. This guard is removed when the support assembly is ready for underwater use.

In one embodiment of the invention successfully built and tested the parts had the following dimensions:

| | Inches |
|---|---|
| 10: Length | 2.312 |
| 12 (smooth end part): | |
|   O.D. | 1.10 |
|   I.D. | 0.875 |
| 14: O.D. | 0.875 |
| Shoulder 42: I.D. | 0.500 |
| Shoulder 52: I.D. | [1] 29/64 |
| 38: | |
|   Length | 7/8 |
|   O.D. | 1/2 |
|   I.D. | 7/16 |
| 16: | |
|   O.D. | 1 3/8 |
|   I.D. | [2] 1.102 |
| 24: | |
|   O.D. | 1.0 |
|   Length | 5/8 |
|   Cable hole | 29/64 |
| 32: | |
|   Width | 3/4 |
|   Depth | 5/8 |
| 36: | |
|   Length | 6 3/4 |

[1] Taper to open end at 15° angle.
[2] Edge of thread, 20 thd/inch.

What is claimed is:

1. A support assembly for an underwater lamp useful for underwater photography comprising a hollow adapter having exteriorly threaded end portions, one of said end portions having a plurality of spaced O rings in the interior thereof, an insulating lamp socket for the terminal leads of a light bulb, and a protective transparent glass cover closed at one end and open at the other end and arranged to fit over the light bulb and socket with the edge of the open end of the cover resting in the interior of said adaptor against one of said O rings while the other O rings engage spaced portions of said glass cover near said open end, said other end portion having a tapered interior into which a hollow tapered resilient gasket is adapted to fit therein, the interior dimensions of said tapered other end portion and the dimensions of said gasket being such as to permit an electric cable to enter said other end portion and be surrounded by said gasket for connection to said socket, and a nut having a threaded interior for threaded engagement with the exterior threads of said other end portion, one end of said nut being closed except for an opening to permit the entry of said cable, for exerting pressure on said gasket.

2. A support assembly according to claim 1 wherein said adaptor has a shoulder in the interior thereof on which the open end edge of said transparent glass cover is adapted to rest, an O ring on the periphery of said shoulder, and a washer between said nut and said gasket for enabling pressure to be exerted on the end of said gasket as said nut is tightened upon said adaptor.

3. A support assembly according to claim 1 wherein said adaptor has a shoulder in the interior thereof on which the open end edge of said transparent glass cover is adapted to rest, an O ring on the periphery of said shoulder, said adaptor having a second shoulder below said first shoulder, a metal grounding sleeve having one end adapted to rest on said second shoulder and adapted to be connected to a grounding wire in said cable, said socket resting on the other end of said sleeve, said glass cover surrounding said sleeve and socket, and a washer between said nut and said gasket for enabling pressure to be exerted on the end of said gasket as said nut is tightened upon said adaptor.

4. A support assembly according to claim 1, wherein said glass cover has an interior diameter which is larger than the width of the light bulb adapted to be placed within said assembly.

5. A support assembly according to claim 1, wherein said glass cover has the shape of a test tube.

6. A support assembly according to claim 1, wherein said glass cover has an interior diameter which is larger than the width of the light bulb adapted to be placed within said assembly, said adaptor having a raised part located intermediate said two exteriorly threaded end portions, and an interiorly threaded compression fitting in threaded engagement with the exterior threads of said one end portion of said adaptor, whereby a light-beam reflector can be clamped between said compression fitting and said raised part of said adaptor.

7. A support assembly according to claim 1, wherein said glass cover has an interior diameter which is larger than the width of the light bulb adapted to be placed within said assembly, said adaptor having a raised part located intermediate said two exteriorly threaded end portions, and an interiorly threaded compression fitting in threaded engagement with the exterior threads of said one end portion of said adaptor, whereby a light-beam reflector can be clamped between said compression fitting and said raised part of said adaptor, said adaptor, compression fitting and nut being brass, and said socket being a round linen micarta material, said gasket being rubber.

8. A support assembly for a lamp bulb useful for underwater photography, comprising a generally cylindrically-shaped hollow adapter having two end portions one of which is adapted to house a lamp socket and a smooth protective transparent cover for the lamp bulb which is removably slidable into said one end portion, said one end portion of said adapter having a shoulder near the bottom thereof and an O ring around said shoulder, said transparent cover being closed at one end and having a round open end section inserted into said one end portion with the open edge of the cover engaging said O ring to provide a watertight seal at said shoulder, said other end portion of said hollow adapter being constructed and designed to house the end of an electrical cable for energizing said lamp bulb, a resilient rubber sleeve in said other end portion surrounding said cable, and adjustable means for exerting pressure on said rubber sleeve to produce a watertight seal between said cable and the interior of said other end portion.

9. A support assembly for a lamp bulb useful for underwater photography, comprising a generally cylindrically-shaped hollow adapter having two end portions one of which is adapted to house a lamp socket and a protective transparent cover for the lamp bulb, said one end portion of said adapter having a shoulder near the bottom thereof and an O ring around said shoulder, said transparent cover being closed at one end and having a round open end section inserted into said one end portion with the open edge of the cover engaging said O ring to provide a watertight seal at said shoulder, said other end portion of said hollow adapter being constructed and designed to house the end of an electrical cable for energizing said lamp bulb, a resilient rubber sleeve in said other end portion surrounding said cable, and adjustable means for exerting pressure on said rubber sleeve to produce a watertight seal between said cable and the interior of said other end portion, and a compression fitting on the exterior of said adapter, said adjustable means being a threaded nut, said transparent cover having the shape of a test tube with an interior diameter larger than the lamp bulb it is designed to house, said adapter, compression fitting and nut being made of the same metallic material.

References Cited

UNITED STATES PATENTS

| | | | |
|---|---|---|---|
| 2,420,362 | 5/1947 | Ekleberry | 240—26 XR |
| 2,908,807 | 10/1959 | Perkins | 240—11.2 XR |
| 3,192,379 | 6/1965 | De Garmo | 240—26 |

NORTON ANSHER, Primary Examiner

F. L. BRAUN, Assistant Examiner

U.S. Cl. X.R.

240—26